United States Patent [19]

Trenkler

[11] 4,352,521

[45] Oct. 5, 1982

[54] MOUNTING ELEMENT WITH THREADED MEMBER ATTACHED TO A BODY WALL OF AN AUTOMOTIVE VEHICLE

[75] Inventor: Werner Trenkler, Asperg, Fed. Rep. of Germany

[73] Assignee: Dr. Ing. h.c.F. Porsche Aktiengesellschaft, Stuttgart, Fed. Rep. of Germany

[21] Appl. No.: 40,739

[22] Filed: May 21, 1979

[30] Foreign Application Priority Data

May 20, 1978 [DE] Fed. Rep. of Germany ....... 2822057

[51] Int. Cl.³ .................... B60R 13/00; B62D 27/02
[52] U.S. Cl. .................................. 296/191; 411/103
[58] Field of Search ................ 296/185, 196, 35.1; 293/120, 126, 704, 708; 52/704, 708; 411/116, 117, 119

[56] References Cited

U.S. PATENT DOCUMENTS

| | | | |
|---|---|---|---|
| 1,144,493 | 6/1915 | Neal | 411/122 |
| 2,213,010 | 8/1940 | MacPherson | 296/185 |
| 2,875,805 | 3/1959 | Flora | 411/111 |
| 2,955,872 | 10/1960 | Barenyi | 296/185 X |
| 2,990,921 | 7/1961 | Wilde | 403/397 |
| 3,068,040 | 12/1962 | Barenyi | 296/185 |
| 3,509,514 | 4/1970 | Christensen | 411/103 |
| 4,059,301 | 11/1977 | Meyer | 293/126 X |

FOREIGN PATENT DOCUMENTS 1210263 9/1959 France .................. 411/103

*Primary Examiner*—David M. Mitchell

[57] ABSTRACT

A vehicle body construction comprising a mounting element with a threaded member attached to a body wall of an automotive vehicle that serves for the attachment of an assembly part includes a plate having a threaded aperture which is inserted into limiting sections forming part of the body wall and is retained therein by a plurality of stops, at least one of which is formed by a bendable tongue.

7 Claims, 3 Drawing Figures

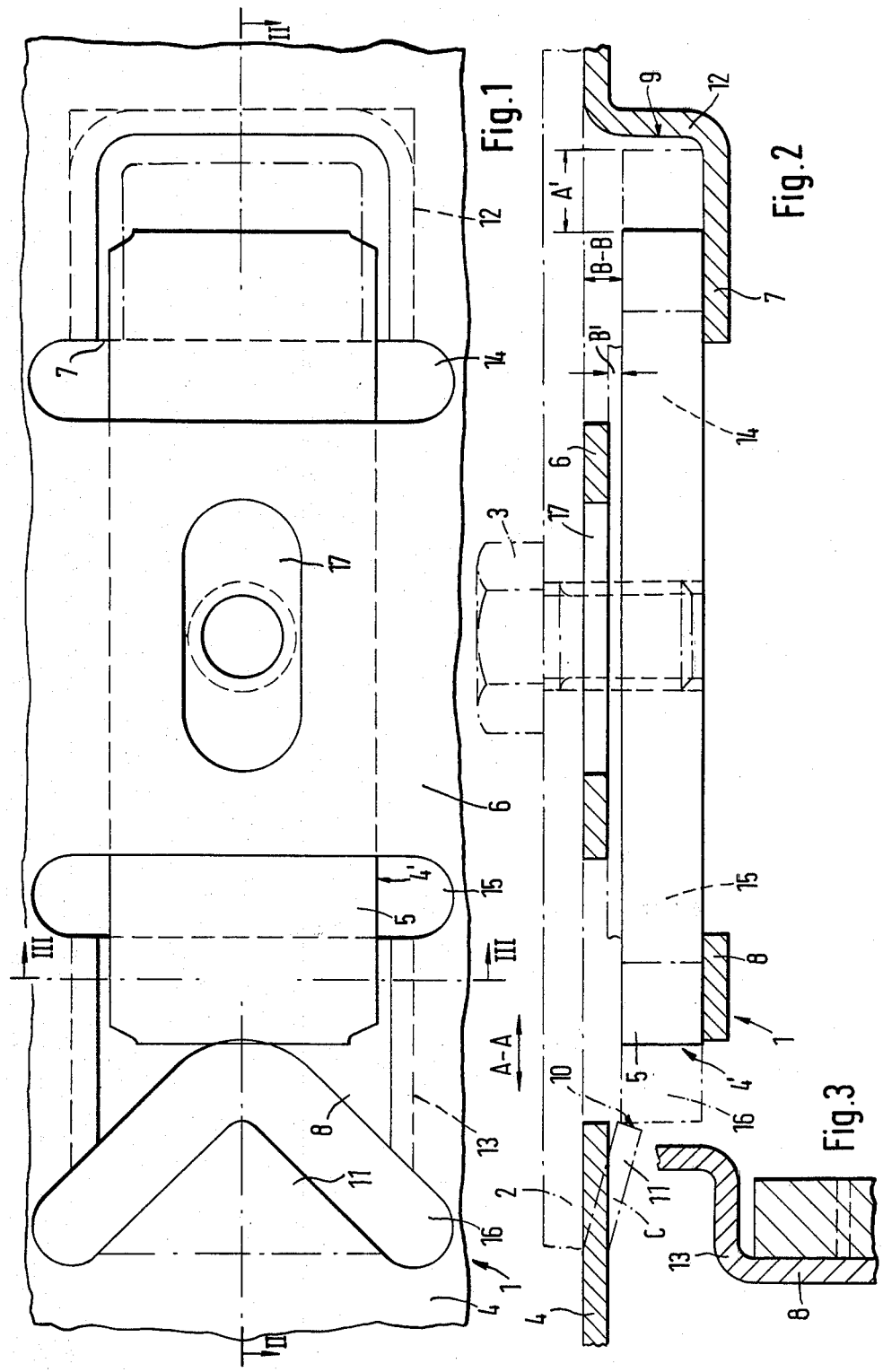

MOUNTING ELEMENT WITH THREADED MEMBER ATTACHED TO A BODY WALL OF AN AUTOMOTIVE VEHICLE

BACKGROUND AND SUMMARY OF THE INVENTION

The invention relates to a mounting element with a threaded member attached to a body wall of an automotive vehicle and serving for the accommodation of an assembly part.

It is known to provide so-called squirrel-cage nuts for the attachment of parts of the assembly to the body wall of an automotive vehicle. This arrangement suffers from the disadvantage that the respective squirrel-cage nut has to be attached by spot welding and consequently requires additional production steps. Moreover, a problem exists in that the thread of the squirrel-cage nut can become clogged with paint during passage of the body through the enameling station, whereby the threaded insertion of the screw is highly complicated.

It is, therefore, an object of the invention to provide a mounting element which can be easily attached to the body wall and causes no problems with regard to the enamel.

According to an embodiment of the invention, this object has been attained by providing that the threaded member comprises a plate held in position by limiting sections as well as stops of the body wall, wherein at least one stop is formed by a bent tongue. In this connection, it is advantageous to manufacture the sections and the stops are fashioned by deforming the body wall and by providing freely extending cuts therein. Finally, the threaded member is floatingly supported for the absorption of tolerances.

The advantages obtained, in particular, by this invention are to be seen in that the mounting element is simple in construction due to the threaded member and the sections and stops limiting this threaded member. The sections and stops can be provided in the wall without causing appreciable expenditure. The threaded member is inserted only after the vehicle has passed through the painting stations and is secured by the bent-away tongue, so that the insertion of a threaded screw in the threaded member cannot be impaired by enamel.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIG. 1 shows a top view of the mounting element according to the invention;

FIG. 2 shows a section along line II—II in FIG. 1; and

FIG. 3 shows a section along line III—III in FIG. 1.

DETAILED DESCRIPTION OF THE PREFERRED EMBODIMENT

The mounting element 1 serves for the accommodation of an assembly part 2 held by means of a threaded screw 3 against a body wall 4 of an automotive vehicle, which latter is not shown in detail. The threaded screw 3 cooperates with a threaded member 4' consisting of a plate 5 having a rectangular base.

The plate 5 is held in position by sections 6, 7, 8 and stops 9, 10, which bound the plate. The stop 10 is shown in the embodiment to be a bent-away tongue 11. Of course, there is also the possibility to fashion the stop 9 as a tongue as well.

The sections 6, 7, 8 and the stops 9, 10, as well as the tongue 11, are manufactured integrally with the body wall 4. For this purpose, the sections 7, 8 and the stops 9, 10 and/or the tongue 11 are formed by shaped portions 12, 13 are freely cut portions 14, 15, 16.

The plate 5 penetrates the free cuts 14, 15. The free cut 16 for the tongue 11 has a V-shape.

The threaded member 4' is floatingly supported in directions A—A and B—B to be able to absorb possibly occurring manufacturing tolerances A' and B'. For this purpose, an oval aperture 17 is provided in section 6. The hot-galvanized threaded member 4' is introduced into its intended position only after the painting step. Thereafter, the tongue 11 is bent into position C, and the threaded member 4' is secured. Optionally, the tongue 11 can also be bent beforehand, and the threaded member 4' is placed into position while overcoming a pretensioning of this tongue 11.

While sections 6, 7 and 8 have been shown and described as formed by shaped portions of the body wall, making the section 6 and/or the sections 7 and 8 of parts attached by spot welding is also contemplated within the scope of the invention.

While I have shown and described one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A vehicle body construction comprising a mounting element with a threaded fastening member attached to a body panel wall of an automotive vehicle and serving for the accommodation of an assembly part, characterized in that the threaded member comprises a plate having major faces bounded by edge sides, and with a threaded aperture, and said body panel wall includes limiting sections, between which said plate is insertable sideways with its faces disposed opposite thereto, as well as stops for retaining said plate at its edge sides in a receiving space located between said limiting sections, wherein at least one of said stops is formed by a portion of said body panel wall cut free in a manner creating a bendable tongue.

2. A vehicle body construction comprising a mounting arrangement for securing a plate-like fastening member having a threaded portion serving for the attachment of an assembly part, said mounting arrangement comprising an interior part of a vehicle body panel wall that has been deformed and cut so as to provide limiting sections, bounding a receiving space within which said plate-like fastening member is insertable, in planes parallel to major surfaces of said plate-like fastening member and at distances from each other precluding withdrawal of the fastening member through said planes, as well as stops, disposed between said planes, for retaining said plate-like fastening member between said limiting sections at sides and ends of the receiving space, after it has been inserted, wherein at least one of said stops is formed by a deformable tongue, whereby said plate-like fastening member may be inserted into said mounting arrangement and retained therein by said tongue, after spraying of said body wall with paint or the like, thereby precluding said paint from impairing operation of said threaded portion.

3. A vehicle body construction according to claim 1 or 2, characterized in that the limiting sections and the stops are formed of unitary portions of the body wall.

4. A vehicle body construction according to claims 1 or 2, characterized in that the limiting sections and the stops are formed by shaped portions of the body wall and by free cuts therein.

5. A vehicle body construction according to claim 1 or 2, characterized in that the receiving space is larger than said fastening member to an extent which enables the fastening member to be supported therein with clearance in a floating fashion for the compensation of tolerances.

6. A vehicle body construction according to claim 1 or 2, wherein said tongue is constructed in a manner that is plastically deformable into a securing position for securing said fastening member within said mounting arrangement.

7. A vehicle body construction according to claim 6, wherein said tongue is plastically deformed prior to insertion of said fastening member into said securing position and is provided with sufficient resilience for enabling said fastening member to be insertable into said mounting arrangement by overcoming a pretensioning of said tongue.

* * * * *